(12) United States Patent
Fehrman et al.

(10) Patent No.: US 6,554,193 B1
(45) Date of Patent: Apr. 29, 2003

(54) SMART CARD WITH REPLACEABLE CHIP

(75) Inventors: R. David Fehrman, Dayton, OH (US); Daniel David Thaxton, New Lebanon, OH (US); Martin H. Hileman, Beavercreek, OH (US); Patrick Fitzgerald Wilkinson, Beavercreek, OH (US)

(73) Assignee: The Standard Register Company, Dayton, OH (US)

( * ) Notice: Subject to any disclaimer, the term of this patent is extended or adjusted under 35 U.S.C. 154(b) by 225 days.

(21) Appl. No.: 09/704,105

(22) Filed: Nov. 1, 2000

Related U.S. Application Data

(63) Continuation of application No. 09/144,303, filed on Aug. 31, 1998, now Pat. No. 6,193,163.

(51) Int. Cl.$^7$ .............................................. G06K 19/02
(52) U.S. Cl. ....................................... 235/488; 235/487
(58) Field of Search ................................. 235/488, 492, 235/487, 441; 902/26, 41; 361/737, 761

(56) References Cited

U.S. PATENT DOCUMENTS

| | | | |
|---|---|---|---|
| 4,511,796 A | 4/1985 | Aigo | |
| 4,714,980 A | 12/1987 | Hara | |
| 4,789,776 A | 12/1988 | Inoue | |
| 4,797,542 A | * 1/1989 | Hara | ........................... 235/380 |
| 4,822,988 A | 4/1989 | Gloton | |
| 4,825,283 A | 4/1989 | Shino | |
| 5,048,179 A | 9/1991 | Shindo et al. | |
| 5,049,728 A | 9/1991 | Le Rovin | |
| 5,081,520 A | 1/1992 | Yoshii et al. | |
| 5,151,774 A | 9/1992 | Mori et al. | |
| 5,155,068 A | 10/1992 | Tada | |
| 5,526,233 A | 6/1996 | Hayakawa | |
| 5,563,440 A | 10/1996 | Roux | |
| 5,581,065 A | 12/1996 | Nishikawa et al. | |
| 5,703,755 A | 12/1997 | Flesher et al. | |
| 5,736,727 A | * 4/1998 | Nakata et al. | ............... 235/486 |
| 5,757,116 A | 5/1998 | Nishikawa et al. | |
| 5,818,030 A | * 10/1998 | Reyes | ......................... 235/487 |
| 5,965,867 A | 10/1999 | Haghiri-Tehrani | |
| 5,991,159 A | 11/1999 | Kraiczyk | |
| 6,193,163 B1 | * 2/2001 | Fehrman et al. | ............ 235/441 |

OTHER PUBLICATIONS

Finn, David; Antenna and Interconnection Technology for Contactless Cards; 1997 Card Tech Secure Tech conference Proceedings; May 19, 1997; 5 pages.

\* cited by examiner

*Primary Examiner*—Karl D. Frech
(74) *Attorney, Agent, or Firm*—Killworth, Gottman, Hagan & Schaeff LLP

(57) ABSTRACT

A smart card is provided having a removable integrated circuit. The integrated circuit is mounted on a semiconductor chip assembly which is locked within the smart card. The semiconductor chip assembly is configured so that once it is locked in place, it may only be removed with a special tool. The special tool allows the locking mechanisms holding the semiconductor chip assembly within the smart card to be disengaged. Attempts to remove the semiconductor chip assembly without the special tool may result in damage to one or both of the semiconductor chip assembly and the smart card. The semiconductor chip assembly may be mounted through the side of the smart card or through one of the faces. A security label applied to the smart card and the semiconductor chip assembly provides additional security with a visual indication of tampering with the semiconductor chip assembly.

37 Claims, 7 Drawing Sheets

SMART CARD WITH REPLACEABLE CHIP

CROSS REFERENCE TO RELATED APPLICATIONS

This application is a continuation of U.S. patent application Ser. No. 09/144,303, filed Aug. 31, 1998, now U.S. Pat. No. 6,193,163.

BACKGROUND OF THE INVENTION

The present invention relates in general to smart cards, and, more particularly, to smart cards in which the internal semiconductor devices may be removed or replaced by an authorized party.

Smart cards have been developed for a wide variety of uses. Smart cards typically include an integrated circuit with a memory element (ROM or RAM) and a control unit, such as a microprocessor or microcomputer. The structure of the integrated circuit is such that it is embedded in a portion of a plastic card having dimensions and physical characteristics of standard credit cards in widespread use. The embedded integrated circuit may include a plurality of terminals on an exterior surface of the card to permit the internal and external transfer of signals to and from the card. Such a smart card is commonly known as a contact smart card. The transfer of signals is accomplished by inserting the card into a compatible reader which provides electrical contacts to interconnect the integrated circuit in the card to a card information processing unit associated with the reader. The reader typically provides power for operating the card, and data is transferred to and from the card whenever it is inserted into the reader. Conversely, a contactless smart card includes an internal power supply and an antenna such that data may be transferred without having to make direct electrical contact the reader.

Since the memories in a smart card can be encoded to identify the card uniquely for a particular application, such a card may be utilized in a number of different application areas. When the sophisticated security features of such cards are employed, the cards may be used as access keys for computer systems, data bases, data networks, or for physical access control to hotel rooms, factories, offices, and the like. Smart cards are increasingly used to access automated bank terminals and permit transaction information to be updated each time a transaction is made so that the card uniquely tracks the authority of the user by information which is written into the memory of the integrated circuit embedded in the card.

Smart cards may also be utilized as small portable files, or records for different types of information, such as personal telephone directories, detailed medical profiles, insurance information, and the like. Smart cards are also useful for point-of-sale credit or debit operations, either in on-line or off-line systems, such as point-of-sale terminals in grocery stores, public telephones and the like.

Smart cards are typically more expensive than regular credit cards because of the integrated circuits embedded in the cards. The plastic material making up the body of a smart card tends to crack and wear out. Additionally, the information printed on the cards may become obsolete. In either situation, it becomes necessary to replace the card. As the integrated circuit is typically embedded in the card, the expensive integrated circuit has been discarded along with the worn-out or obsolete body. It is thus desirable to provide a smart card in which the expensive integrated circuit may be removed from the card body when the body is worn-out or obsolete.

For example, one such smart card having a removable integrated circuit is taught in U.S. Pat. No. 4,511,796. The smart card includes an integrated circuit which may be inserted or removed by simply rotating the integrated circuit into and out of the card. While the integrated circuit may be easily replaced or transferred to another card, there is no provision to prevent unauthorized access to the integrated circuit. Such unauthorized access may lead to tampering, theft, fraud or misuse.

Accordingly, there is a need for a smart card having an integrated circuit which may be removed or replaced by authorized personnel only. There is also a need for a smart card which provides an indication of tampering with the integrated circuit. Preferably, removal of the integrated circuit would be easy to implement while manufacture of such as smart card would be relatively inexpensive.

SUMMARY OF THE INVENTION

The present invention meets this need by providing a card having an integrated circuit. The integrated circuit is mounted on a semiconductor chip assembly which is locked within the smart card. The semiconductor chip assembly is configured so that once it is locked in place, it may only be removed with a special tool. The special tool allows the locking mechanisms holding the semiconductor chip assembly within the smart card to be disengaged. Attempts to remove the semiconductor chip assembly without the special tool may result in damage to one or both of the semiconductor chip assembly and the smart card. The semiconductor chip assembly may be mounted through the side of the smart card or through one of the faces. A security label may be applied to the smart card and the semiconductor chip assembly to provide an indication of tampering with the semiconductor chip assembly.

According to a first aspect of the present invention, a card comprises a card body and a semiconductor chip assembly. The card body includes a cut-out portion, a groove generally adjacent to a portion of the cut-out portion terminating in at least a first locking area and a first inlet notch extending through a top face to the groove. The semiconductor chip assembly includes a semiconductor device positioned thereon and a first engagement member corresponding to the first inlet notch. The semiconductor chip assembly is positioned within the cut-out portion of the card body with the first engagement member aligned with the first inlet notch. The semiconductor chip assembly is rotatable such that the first engagement member rotates within the groove and locks in place in the first locking area.

The first engagement member may comprise a first end portion of the semiconductor chip assembly or a first tab extending from the semiconductor chip assembly. The card body may comprise a second inlet notch and the semiconductor chip assembly may comprise a second engagement member corresponding to the second inlet notch. Preferably, the first and second inlet notches are positioned to only accept semiconductor chip assemblies having correspondingly positioned first and second engagement members. The first and second inlet notches may be shaped to only accept semiconductor chip assemblies having correspondingly shaped first and second engagement members. Preferably, the groove terminates in a second locking area such that the first engagement member locks in place in the first locking area and the second engagement member locks in place in the second locking area.

The groove preferably includes a first sloped portion forming a first shoulder in the first locking area. The groove may also be generally planar or comprised of a stepped structure. Preferably, the card body comprises a first laminate having the cut-out portion and the first inlet notch formed therethrough. The card body may further comprise a second laminate having the cut-out portion and a first area formed therethrough with the first area overlapping the first inlet notch and forming a portion of the groove. The card body may further comprise a third laminate having the cut-out portion and a second area formed therethrough with the second area overlapping a portion of the first area and forming another portion of the groove. The card body may further comprise a fourth laminate covering the third laminate and the cut-out portion. The first locking area may be formed in the second area of the third laminate or in the second laminate offset from the first area.

The card may further comprise a security label placed over a portion of the card body and a portion of the semiconductor chip assembly thereby providing an indication of tampering with the semiconductor chip assembly. Preferably, the security label extends across the top face and a bottom face of the card body. The security label may comprise a frangible layer or a holographic layer.

The card body has a thickness ranging from approximately 7 mils to approximately 60 mils. A top surface of the semiconductor chip assembly may be substantially coplanar with, recessed below or extended above a plane defined by the top face of the card body. The card body may include a laminate formed on a back face of the card body covering the cut-out portion.

According to another embodiment of the present invention, a card comprises a card body and a generally circular semiconductor chip assembly. The card includes a generally circular cut-out portion corresponding to the generally circular semiconductor chip assembly, a groove extending radially in an arc about the cut-out portion terminating in a first locking area and a second locking area, a first inlet notch and a second inlet notch positioned generally adjacent the cut-out portion and extending through a top face to the groove. The semiconductor chip assembly includes a semiconductor device positioned thereon, a first engagement member corresponding to the first inlet notch and a second engagement member corresponding to the second inlet notch. The semiconductor chip assembly is positioned within the cut-out portion of the card body with the first engagement member aligned with the first inlet notch and the second alignment member aligned with the second inlet notch. The semiconductor chip assembly is rotatable such that the first and second engagement members rotate within the groove and lock in place in the first and second locking areas, respectively.

Preferably, the first inlet notch is positioned at a first angular location and the second inlet notch is positioned at a second angular location such that the card body only accepts semiconductor chip assemblies having correspondingly positioned first and second engagement members. The groove may include a first sloped portion forming a first shoulder in the first locking area and a second sloped portion forming a second shoulder in the second locking area. The groove may also be generally planar or comprised of a stepped structure. The card may further comprise a security label placed over a portion of the card body and a portion of the semiconductor chip assembly to provide an indication of tampering with the semiconductor chip assembly. The security label may comprise a frangible layer or a holographic layer. The security label preferably extends across the top face and a bottom face of the card body.

The card body may comprise a first laminate having the cut-out portion, the first inlet notch and the second inlet notch formed therethrough, a second laminate having the cut-out portion and a first area formed therethrough with the first area overlapping the first inlet notch and the second inlet notch and forming a portion of the groove, a third laminate having the cut-out portion and a second area formed therethrough with the second area overlapping a portion of the first area and forming another portion of the groove, and a fourth laminate covering the third laminate and the cut-out portion. The first and second locking areas may be formed in part of the second area of the third laminate or in the second laminate offset from the first area.

According to yet another aspect of the present invention, a card comprises a card body having a cut-out portion extending through a side thereof and a semiconductor chip assembly having a semiconductor device positioned thereon. The semiconductor chip assembly is positioned within the cut-out portion through the side of the card body.

The card the semiconductor chip assembly may comprise first and second projections extending along opposing sides thereof engaging corresponding first and second grooves formed on opposing sides of the cut-out portion of the card body. Alternatively, the card body may include first and second projections formed on opposing sides of the cut-out portion engaging corresponding first and second grooves extending along opposing sides of the semiconductor chip assembly. Preferably, the card body includes a first locking member within the cut-out portion while the semiconductor chip assembly includes a corresponding second locking member such that the semiconductor chip assembly is locked within the cut-out portion of the card body as the first locking member engages the second locking member.

The card may further comprise a security label placed over a portion of the card body and a portion of the semiconductor chip assembly to provide an indication of tampering with the semiconductor chip assembly. The security label may comprise a frangible layer or a holographic layer. Preferably, the security label extends across a top face and a bottom face of the card body or across the side of the card body. A top surface of the semiconductor chip assembly may be substantially coplanar with a top face of the card body. The card body may include a laminate formed on a back face thereof covering the cut-out portion.

According to a further aspect of the present invention, a method of forming a card comprises providing a card body. A cut-out portion and a groove are formed in the card body. The groove is positioned generally adjacent a portion of the cut-out portion terminating in a first locking area. A first inlet notch is formed in the card body extending through a top face thereof to the groove. A semiconductor chip assembly is provided having a semiconductor device formed thereon. The semiconductor chip assembly includes a first engagement member corresponding to the first inlet notch. The semiconductor chip assembly is positioned within the cut-out portion of the card body with the first engagement member aligned with the first inlet notch. The semiconductor chip assembly is rotated so that the first engagement member rotates within the groove and locks in place in the first locking area.

The steps of forming a cut-out portion, forming a groove and forming a first inlet notch in the card body may be performed by injection molding or milling of the card body. The step of forming a groove in the card body generally adjacent a portion of the cut-out portion terminating in a first locking area may comprise the step of forming a first sloped portion within the groove thereby forming a first shoulder in the first locking area. The method may further comprise the step of applying a security label over a portion of the card body and a portion of the semiconductor chip assembly to provide an indication of tampering with the semiconductor chip assembly. The security label preferably extends across the top face and a bottom face of the card body.

According to yet another aspect of the present invention, a method of forming a card comprises providing a card body having a first laminate, a second laminate, a third laminate and a fourth laminate. A cut-out portion is formed through the first, second and third laminates. A first inlet notch is formed through said first laminate. A first area is formed in the second laminate such that a portion of the first area overlaps the first inlet notch. A second area is formed in the third laminate such that a portion of the second area overlaps the first area. The first and second areas form a groove in the card body. The first, second, third and fourth laminates are laminated together. A semiconductor chip assembly is provided having a semiconductor device formed thereon. The semiconductor chip assembly includes a first engagement member corresponding to the first inlet notch. The semiconductor chip assembly is positioned within the cut-out portion of the first laminate with the first engagement member aligned with the first inlet notch. The semiconductor chip assembly is rotated such that the first engagement member rotates within the groove and locks in place in a first locking area.

The method may further comprise the step of forming the first locking area in the second laminate. Alternatively, the first locking area may comprise a portion of the second area. The step of rotating the semiconductor chip assembly such that the first engagement member rotates within the groove and locks in place in a first locking area may comprise the steps of rotating the semiconductor chip assembly until the first engagement member contacts an end of the first area and then applying pressure to the semiconductor chip assembly and rotating the semiconductor chip assembly until the first engagement member contacts an end of the second area.

According to a still further aspect of the present invention, a method of forming a card comprises providing a card body. A cut-out portion is formed in the card body extending through a side thereof. A semiconductor chip assembly is provided having a semiconductor device formed thereon. The semiconductor chip assembly includes a first engagement member corresponding to the first inlet notch. The semiconductor chip assembly is slid into the cut-out portion through the side of the card body.

The step of providing a semiconductor chip assembly may comprise the step of forming first and second projections extending along opposing sides of the semiconductor chip assembly and the step of forming a cut-out portion in the card body extending through a side thereof may comprise the step of forming corresponding first and second grooves on opposing sides of the cut-out portion with the first and second projections of the semiconductor chip assembly engaging the corresponding first and second grooves. Alternatively, the step of forming a cut-out portion in the card body extending through a side thereof may comprise the step of forming first and second projections extending along opposing sides of the cut-out portion and the step of providing a semiconductor chip assembly may comprise the step of forming corresponding first and second grooves on opposing sides of the semiconductor chip assembly with the first and second projections of the card body engaging the corresponding first and second grooves.

The step of forming a cut-out portion in the card body extending through a side thereof may comprise the step of forming a first locking member within the cut-out portion and the step of providing a semiconductor chip assembly may comprise the step of forming a corresponding second locking member such that the semiconductor chip assembly is locked within the cut-out portion of the card body as the first locking member engages the second locking member. The method may further comprise the step of applying a security label over a portion of the card body and a portion of the semiconductor chip assembly to provide an indication of tampering with the semiconductor chip assembly. The security label may extend across the top face and a bottom face of the card body or across the side of the card body. The step of forming a cut-out portion in the card body extending through a side thereof may be performed by injection molding, milling or punching out of the card body.

Accordingly, it is an object of the present invention to provide a smart card having an integrated circuit which may be removed or replaced only by authorized personnel having a special tool. It is a further object of the present invention to provide a smart card that provides an indication that there has been unauthorized tampering with the integrated circuit. It is another object of the present invention to provide a smart card in which authorized removal of the chip is easily implemented. It is yet another object of the present invention to provide a smart card, the manufacture of which is cost effective. Other features and advantages of the invention will be apparent from the following description, the accompanying drawings and the appended claims.

DETAILED DESCRIPTION OF THE INVENTION

Figure 1:
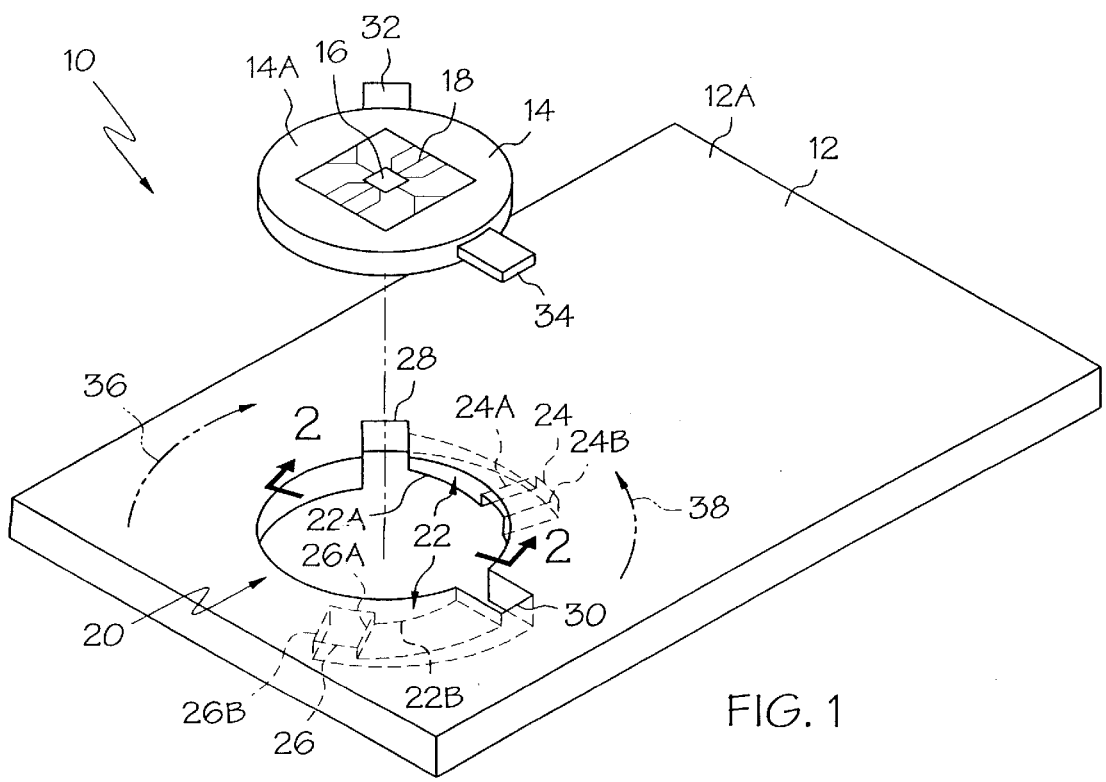
FIG. 1 is an exploded view of a smart card according to one embodiment of the present invention.

Referring to FIG. 1, a smart card 10 according to one embodiment of the present invention is shown. The smart card 10 includes a card body 12 and a semiconductor chip assembly 14. The semiconductor chip assembly 14 comprises a semiconductor device 16. The semiconductor device 16 is mounted on the semiconductor chip assembly 14 using methods well known in the art. A plurality of leads 18 extend from the semiconductor device 16 and function as contacts for interfacing with a card reader (not shown). Such a smart card 10 is commonly known as a contact smart card.

The semiconductor device 16 comprises an integrated circuit comprising one or more semiconductor elements or a plurality of separate semiconductor elements. The semiconductor elements may include one or more memory elements (ROM or RAM) and one or more control units, such as microprocessors or microcomputers. It will be appreciated by those skilled in the art that the semiconductor chip assembly 16 may also include one or more additional elements depending on the particular application for which the smart card 10 is being used. For example, if the smart card 10 is a contactless card, the semiconductor chip assembly 14 may also include a power supply and an antenna.

The card body 12 includes a cut-out portion 20 for receiving the semiconductor chip assembly 14. In the illustrated embodiment, the cut-out portion 20 and the semiconductor chip assembly 14 are generally circular. The card body 12 also includes a groove 22 extending radially in an arc about the cut-out portion 20 terminating in a first locking area 24 and a second locking area 26. A first inlet notch 28 and a second inlet notch 30 are positioned generally adjacent the cut-out portion 20 and extend through a top face 12A of the card body 12 to the groove 22.

The semiconductor chip assembly 14 includes a first engagement member 32 and a second engagement member 34 corresponding to the angular position of the first and second inlet notches 28, 30, respectively. In the illustrated embodiment, the first and second engagement member 32, 34 are tabs which extend from the edge of the semiconductor chip assembly 14. The first inlet notch 28 is positioned at a first angular location while the second inlet notch 30 is positioned at a second angular location a predetermined number of degrees from the first angular location. The first and second angular positions are preferably offset from each other by a number of degrees so that smart card 10 only accepts semiconductor chip assembly 14 having correspondingly spaced engagement members. Such an arrangement ensures that compatible semiconductor chip assemblies are used with each smart card. It will be appreciated by those skilled in the art that in addition to or in place of the specific angular relationship arrangement between the engagement members/inlet notches, one or both of the engagement members/inlet notches may be uniquely shaped to ensure that only compatible semiconductor chip assemblies are used with a particular smart card. It should be apparent that the separation should be sufficient so that the engagement members provide sufficient force to keep the chip assembly 14 locked in place within the card body 12. It will be further appreciated by those skilled in the art that chip assembly 14 may comprise any reasonable number of engagement members.

The semiconductor chip assembly 14 is positioned within the cut-out portion 20 with the first engagement member 32 aligned with the first inlet notch 28 and the second engagement member 34 aligned with the second inlet notch 30. The semiconductor chip assembly 14 is rotated in a first direction 36 until the first and second engagement members 32, 34 engage the first and second locking areas 24, 26 at which point the semiconductor chip assembly 14 is locked in place.

Figure 2:
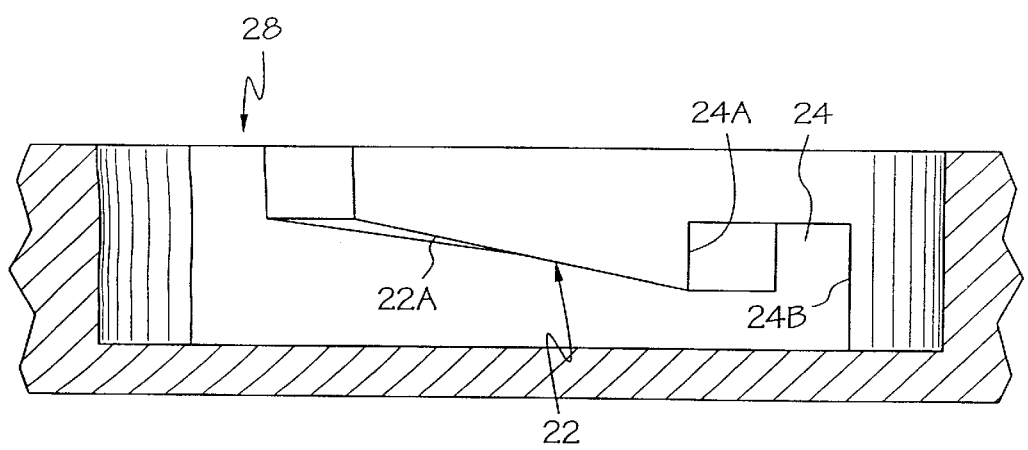
FIG. 2 is a cross-sectional view of the smart card of FIG. 1 taken along view line 2—2.
Figure 3:
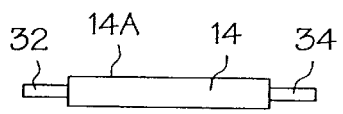
FIG. 3 is a side view of a semiconductor chip assembly for use with the smart card of FIG. 1.

Referring now to FIG. 2, the groove 22 includes a first sloped portion 22A which extends downwards from the first inlet notch 28 to the first locking area 24 thereby forming a first shoulder portion 24A. The groove 22 also includes a corresponding second sloped portion 22B which extends downwards from the second inlet notch 30 to the second locking area 26 thereby forming a second shoulder portion 26A. The first and second locking areas 24, 26 also include respective first and second walls 24B, 26B; see also FIG. 1. Referring now to FIG. 3, the first and second engagement members 32, 34 are positioned substantially adjacent to a top surface 14A of the chip assembly 14. The first sloped portion 22A and the second sloped portion 22B are configured so that with the semiconductor chip assembly 14 positioned within the cutout portion 20, the first and second engagement members 32, 34 engage the leading edges of the sloped portions. The first and second engagement members 32, 34 are pushed down and flexed or stressed as the semiconductor chip assembly 14 is rotated. The first and second engagement members 32, 34 return to their unflexed or unstressed state once positioned in the first and second locking areas 24, 26, respectively, such that the semiconductor chip assembly 14 is locked in place.

The semiconductor chip assembly 14 may not be merely rotated in a second direction 38, opposite the first direction 36, and removed since the first and second engagement members 32, 34 engage the respective shoulder portions 24A, 26A which prevent movement in that direction. Similarly, further movement in the first direction 36 is also prevented as the first and second engagement members 32, 34 engage the first and second walls 24B, 26B, respectively. The first and second engagement members 32, 34 would have to be depressed to engage the groove 22 so that the semiconductor chip assembly 14 may be rotated. It will be appreciated by those skilled in the art that the groove 22 may be generally planar without one or both of the sloped portions.

The smart card 10 is preferably formed of the same plastic material used to form credit cards. The thickness of the smart card 10 may range from approximately 7 mils to 60 mils, and preferably, from approximately 20 mils to 33 mils, and more preferably, approximately 33 mils. The cut-out portion 20, the inlet notches 28, 30 and the groove 22 may be formed using a variety of techniques, such as injection molding of the card bodies 12, 102, or milling the cut-out portion 20, the inlet notches 28, 30 and the groove 22.

Figure 4:
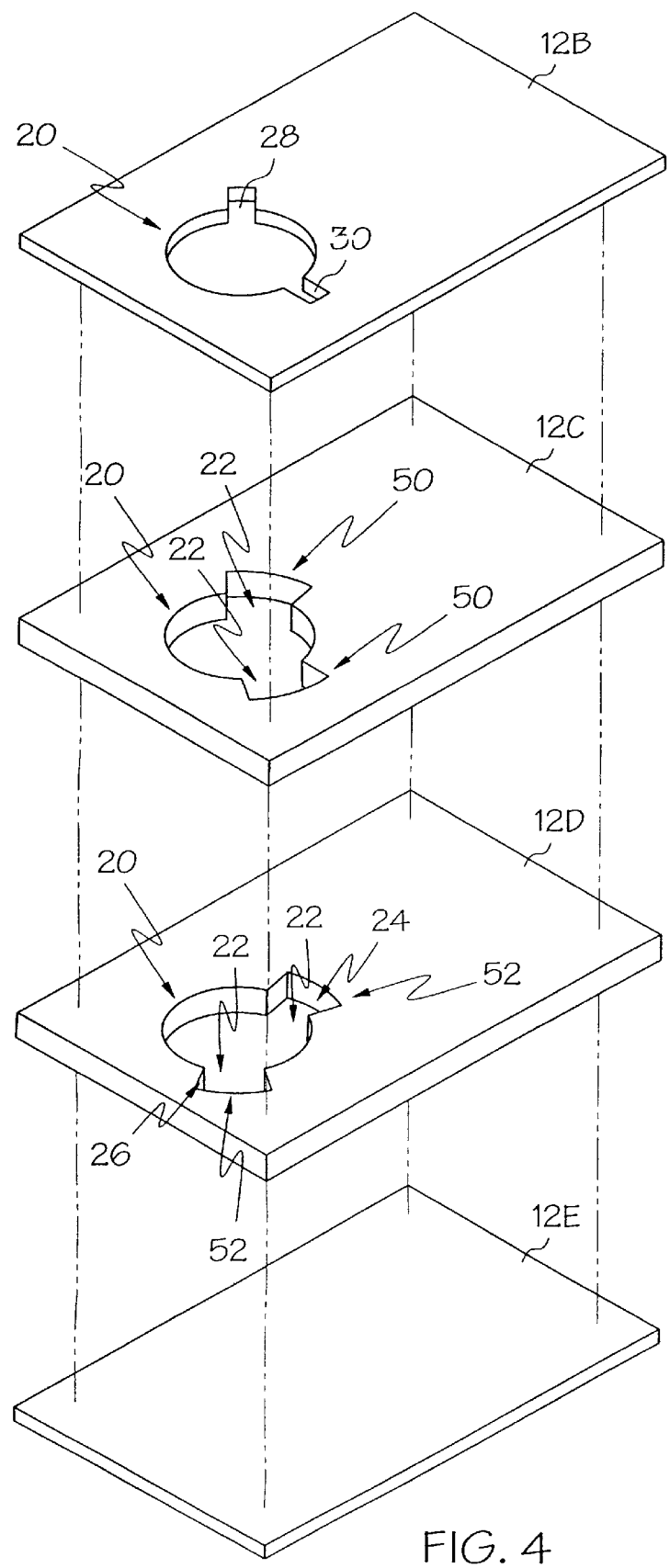
FIG. 4 is an exploded view of a smart card according to another embodiment of the present invention.

FIG. 4 illustrates the formation of the cut-out portion 20, the inlet 28, 30 and the groove 22 according to another aspect of the present invention. The card body 12 comprises a first or top laminate 12B, a second or first middle laminate 12C, a third or second middle laminate 12D and a fourth or bottom laminate 12E. The top and bottom laminates 12B and 12E are commonly referred to as the "skins" of the card while the first and second middle laminates 12C, 12D are commonly referred to as the "body" of the card. In the illustrated embodiment, the thickness of the card body 12 is approximately 30 mils with the top and bottom laminates 12B, 12E each accounting for approximately 1 mil and the first and second middle laminates 12C each accounting for approximately 14 mils.

The cut-out portion 20 is formed in the top laminate 12B, the first middle laminate 12C and the second middle laminate 12D by punching out the cut-out portions 20 using techniques known in the art. The first and second.inlet notches 28, 30 are also punched out of the top laminate 12B in the appropriate positions. Additionally, a first area 50 is punched out of the first middle laminate 12C while a second area 52 is punched out of the second middle laminate 12D. The bottom laminate 12E covers the cut-out portion 20 and the second area 52. The first and second areas 50, 52 are generally of the same dimensions except offset radially from each other by at least the width of the first and second engagement members 32, 34. The first area 50 extends radially from the trailing edges of the inlet notches 28, 30 past the leading edges of the second area 52 punched out of the second middle laminate 12D. It should therefore be apparent that the inlet notches 28, 30 overlap a portion of the first area 50 while the first area 50 overlaps a portion of the second area 52 thereby forming a stepped structure from one laminate to another. The groove 22 therefore comprises a portion of the first area 50 and the second area 52 while the first and second locking areas 24, 26 comprise a portion of the second area 52. Once the requisite portions of the laminates 12B, 12C and 12D have been punched, the laminates 12B, 12C, 12D, 12E are secured together using techniques known in the art.

To insert the semiconductor chip assembly 14 into the card body 12, the semiconductor chip assembly 14 is positioned within the cut-out portion 20 with the first engagement member 32 aligned with the first inlet notch 28 and the second engagement member 34 aligned with the second inlet notch 30. The semiconductor chip assembly 14 is pushed down with the first and second engagement members 32, 34 extending below the top laminate 12B and into the first area 50 in the first middle laminate 12C. The semiconductor chip assembly 14 is rotated until the leading edges of the first and second engagement members 32, 34 contact the ends of the first area 50. The semiconductor chip assembly 14 is pushed down again with the first and second engagement members extending below the first middle laminate 12C. The semiconductor chip assembly 14 is rotated until the leading edges of the first and second engagement members 32, 34 contact the ends of the second area 50. The first and second engagement members 32, 34 are not locked between the shoulders 24A, 24B and 26A, 26B, respectively, as described above, but may rotated back and forth slightly. A security label as described below may be used to secure the semiconductor chip assembly 14 in place. It will be appreciated by those skilled in the art that the semiconductor chip assembly 14 may be pushed down by hand or with any appropriate tool.

Figure 5:
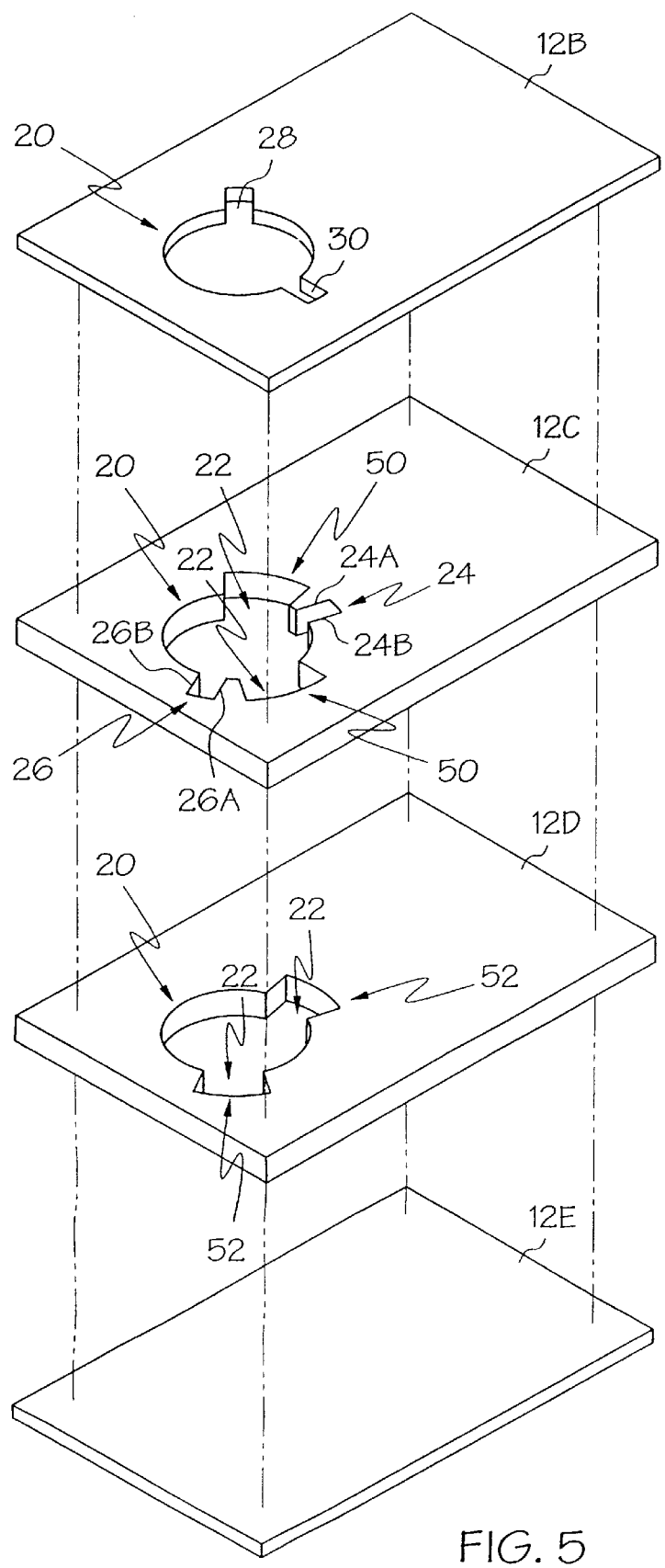
FIG. 5 is an exploded view of a smart card according to another embodiment of the present invention.

Referring now to FIG. 5, with like reference numerals corresponding to like components, another embodiment of the present invention is illustrated. In this embodiment, the first and second locking areas 24, 26 are punched out of the first middle laminate 12C. The first and second locking areas 24, 26 are offset radially from the first area 50 and overlap the second area 52. The groove 22 is a stepped groove comprising portions of the first and second areas 50, 52. In the illustrated embodiment, the semiconductor chip assembly 14 is inserted into the card member 12 as described above with respect to FIG. 4, but once the first and second engagement members 32, 34 contact the ends of the second area 52 and downward force on the semiconductor chip assembly 14 is removed, the first and second engagement members 32, 34 "pop" into place in the first and second locking areas 24, 26, respectively. The first and second engagement members 32, 34 are locked between the shoulders 24A, 24B and 26A, 26B, respectively, as described above. It will be appreciated by those skilled in the art that the number of laminates used to form the card member 12 may be varied as desired. It will be further appreciated by those skilled in the art that the thickness of the various laminates may be varied as desired for the particular application.

Figure 6A:
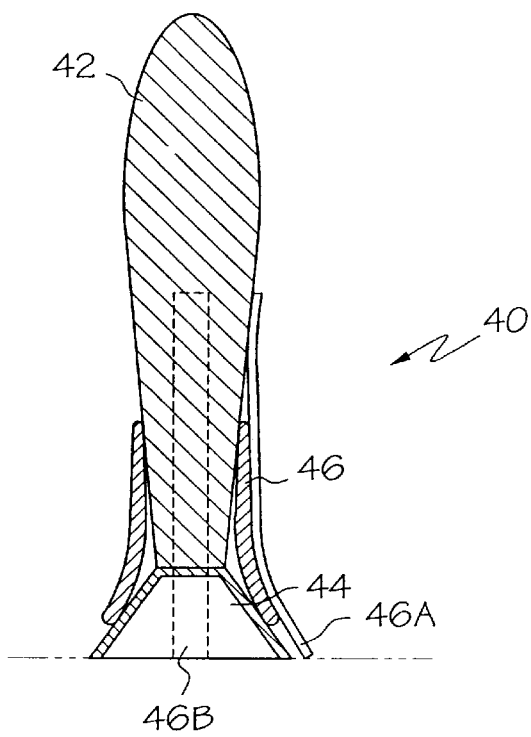
FIG. 6A is a cross-sectional view of a special tool for removing the semiconductor chip assembly from the smart card of FIG. 1 with a sleeve in a retracted position.
Figure 6B:
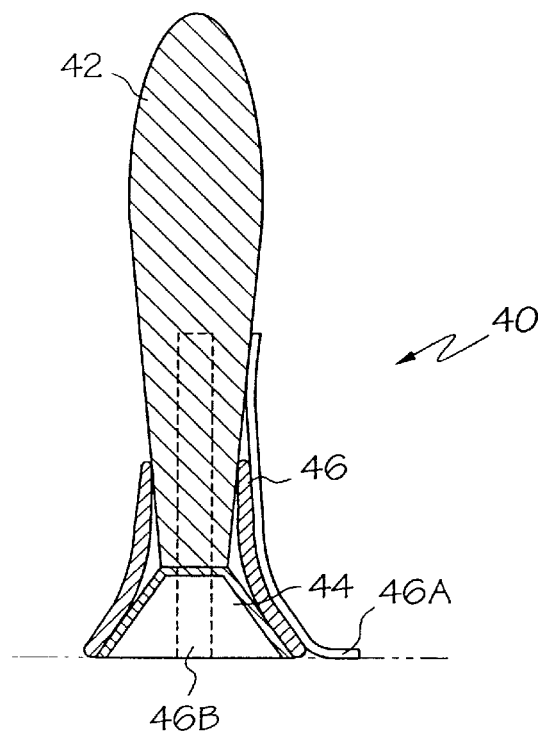
FIG. 6B is a cross-sectional view of the special for removing the semiconductor chip assembly from the smart card of FIG. 1 with the sleeve in an extended position.
Figure 7A:
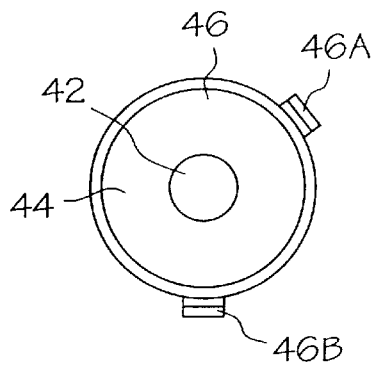
FIG. 7A is a bottom view of the special tool of FIG. 6A.
Figure 7B:
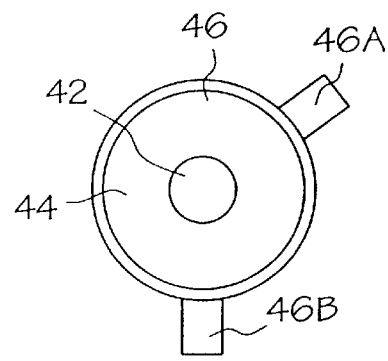
FIG. 7B is a bottom view of the special tool of FIG. 6B.

The semiconductor chip assembly 14 may be removed as necessary using a special tool, such as the special tool 40 shown in FIGS. 6A, 6B, 7A and 7B. The tool 40 comprises a handle 42, a suction cup 44 and a sleeve 46. The sleeve 46 is formed of a flexible, yet semi-rigid material, such as polycarbonate. The sleeve 46 is configured so that in a retracted position it wraps around the handle 42 as shown in FIG. 6A while in a extended position it is substantially flat and spread out as shown in FIG. 6B. As shown in FIGS. 6B and 7B, in the second extended position, the sleeve 46 includes a first finger 46A and a second finger 46B sized and positioned to correspond to the size and angular position of the first and second engagement members 32, 34. As shown in FIG. 6A, the fingers 46A, 46B extend below the outer lip of the sleeve 46. The fingers 46A, 46B extend outwards at a slight downwards angle as the sleeve 46 is extended. It should be apparent that the configuration of the sleeve 46, and particularly, the fingers 46A, 46B will be dependent on the configuration of the semiconductor chip assembly 14 and the first and second engagement members 32, 34.

To remove the semiconductor chip assembly 14, the tool 40 is appropriately positioned so that the suction cup 44 engages the approximate center of the semiconductor chip assembly 14 and the fingers 46A, 46B are aligned with the engagement members 32, 34. The sleeve 46 is extended such that the first and second fingers 46A, 46B extend into the first and second locking areas 24, 26, respectively, forcing down the first and second engagement members 32, 34 below the shoulders 24A, 26A. The semiconductor chip assembly 14 is rotated in the second direction 36 and removed.

In the illustrated embodiment, the semiconductor chip assembly 14 is composed of a sturdy plastic material. The chip assembly 14 preferably includes a recessed area (not shown) in which the semiconductor device 16 is mounted. The semiconductor device 16 may be fastened to the chip assembly 14 using any appropriate mounting technique, such as an appropriate adhesive. It will be appreciated by those skilled in the art that the semiconductor device 16 and the leads 18 may be mounted on a separate structure which is itself mounted on the chip assembly 14 using any appropriate technique. The chip assembly 14 is composed of sturdy plastic material to prevent flexation of the semiconductor device 16 as semiconductor devices are susceptible to damage when subjected to such force. However, it will be appreciated by those skilled in the art that the semiconductor chip assembly 14 may be composed of other suitable materials.

The dimensions of the first and second engagement members 32, 34 are selected so that the semiconductor chip assembly 14 may not removed by merely applying a sufficient upwards force. It should be apparent that the appropriate volume for the engagement members 32, 34 will depend on the type and density of plastic used to the form the semiconductor chip assembly 14. The semiconductor chip assembly 14 may be formed using injection molding or other suitable processes. The thickness of the semiconductor chip assembly 14 may be selected so that the top surface 14A is substantially coplanar with, recessed below or extends above the plane defined by the top face 12A of the card body 12 as necessary for the particular application for the smart card 10.

Figure 8:
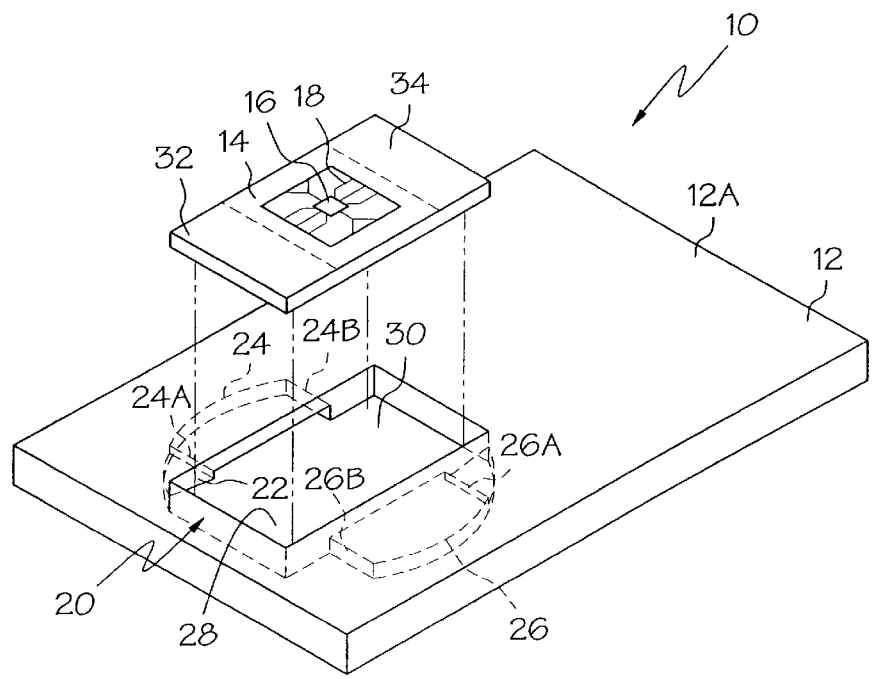
FIG. 8 is an exploded view of a smart card according to yet another embodiment of the present invention.

While the cut-out portion 20 and the semiconductor chip assembly 14 were shown as substantially circular in FIG. 1, it should be apparent that the cut-out portion 20 and the semiconductor chip assembly 14 may have any desired shape as long as the shapes generally correspond to one another. For example, as shown in FIG. 8, with like reference numerals corresponding to like components, the cutout portion 20 and the semiconductor chip assembly 14 are generally rectangular in shape. In this configuration, the first and second engagement members 32, 34 form first and second end portions of the semiconductor chip assembly 14 while the first and second inlet notches 28, 30 form first and second portions of the cut-out portion 20. The semiconductor chip assembly 14 locks in place as it is rotated in the groove 22 and the first and second engagement members 32, 34 engage the first and second locking areas 24, 26, respectively. It should be apparent that the shape of the cut-out portion 20 and the semiconductor chip assembly 14 may be slightly trapezoidal so that only compatible semiconductor chip assemblies are used with a particular smart card. It will be appreciated by those skilled in the art that the smart card 10 illustrated in FIG. 8 may be formed using a variety of techniques, such as appropriate injection molding, milling, or an appropriate multi-layer structure similar to that illustrated in FIGS. 4 and 5.

Figure 9:
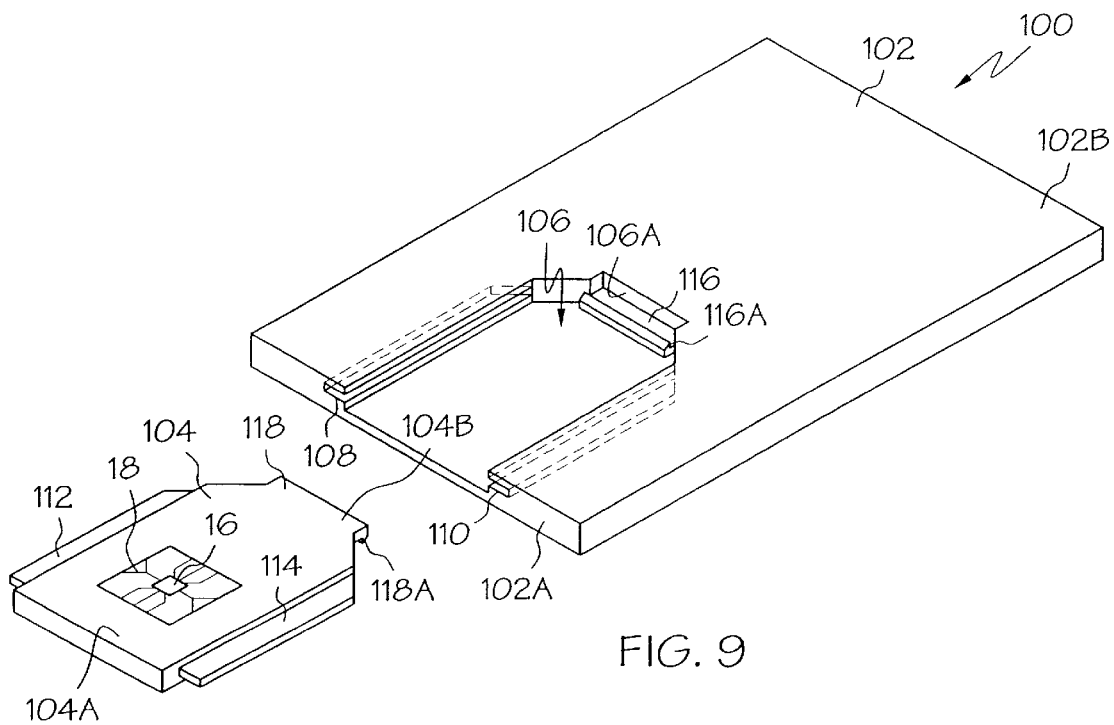
FIG. 9 is an exploded view of a smart card according to a further embodiment of the present invention.

Referring now to FIG. 9, a smart card 100 according to another embodiment of the present invention is shown with like reference numerals corresponding to like components. The smart card 100 comprises a card body 102 and a semiconductor chip assembly 104. The semiconductor chip assembly 104 comprises the semiconductor device 16 as described above. The card body 102 includes a cut-out portion 106 extending through a side 102A of the card body 102. It will be appreciated by those skilled in the art that the cut-out portion 106 may extend through any of the sides of the card body 102. In the illustrated embodiment, the cut-out portion 106 is generally rectangular in shape to receive the similarly shaped semiconductor chip assembly 104.

Figure 10:
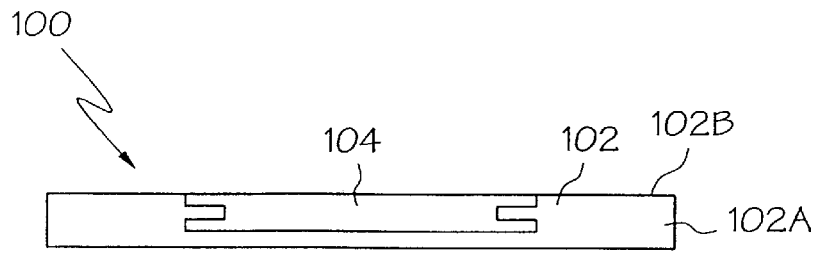
FIG. 10 is a side view of the smart card of FIG. 9.

The card body 102 includes a first groove 108 and a second groove 110 formed on opposing sides of the cut-out portion 106. The semiconductor chip assembly 104 includes a first projection 112 and a second projection 114 extending along opposing sides of the chip assembly 104. The first and second projections 112, 114 are configured to engage the first and second grooves 108, 110, respectively, so that the chip assembly 104 is slid through the side 102A of the card body 102 into the cut-out portion 106. As shown in FIG. 10 and as appreciated by those skilled in the art, the card body 102 may include first and second projections while the semiconductor chip assembly 104 may include corresponding first and second grooves receiving the first and second projections. As with the smart card 10, the thickness of the semiconductor chip assembly 104 may be selected so that a top surface 104A is substantially coplanar with, recessed below or extends above the plane defined by a top face 102B of the card body 102 as necessary for the particular application for the smart card 100.

Referring again to FIG. 9, the card body 102 includes a first locking member 116 positioned within the cut-out portion 106 generally adjacent a first end 106A of the cutout portion 106. The semiconductor chip assembly 104 includes a corresponding second locking member 118 positioned generally adjacent to a leading end 104B of the semiconductor chip assembly 104. In the illustrated embodiment, the first and second locking members 116, 118 include opposing hooks 116A, 118A which engage one another as the chip assembly 104 is slid into place. Once engaged, the semiconductor chip assembly 104 is locked in place within the card body 102. A special tool (not shown) is then required to disengage the first and second members 116, 118 so that the semiconductor chip assembly 104 may be removed. It will be appreciated by those skilled in the art that other locking devices may be used.

The smart card 100 is preferably formed of the same plastic material used to form credit cards. The thickness of the smart card 100 may range from approximately 7 mils to 60 mils, and preferably, from approximately 20 mils to 33 mils, and more preferably, approximately 33 mils. It will be appreciated by those skilled in the art that the smart card 100 may be formed using a variety of techniques, such as appropriate injection molding, milling, or an appropriate multi-layer structure similar to that illustrated in FIGS. 4 and 5.

Figure 11:
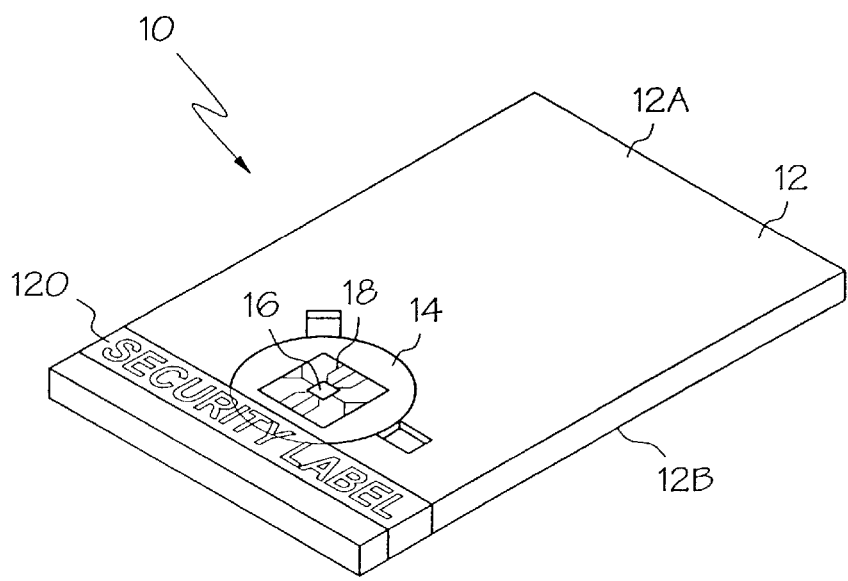
FIG. 11 is a perspective view of the smart card of FIG. 1 with a security label extending across the top face thereof.
Figure 12:
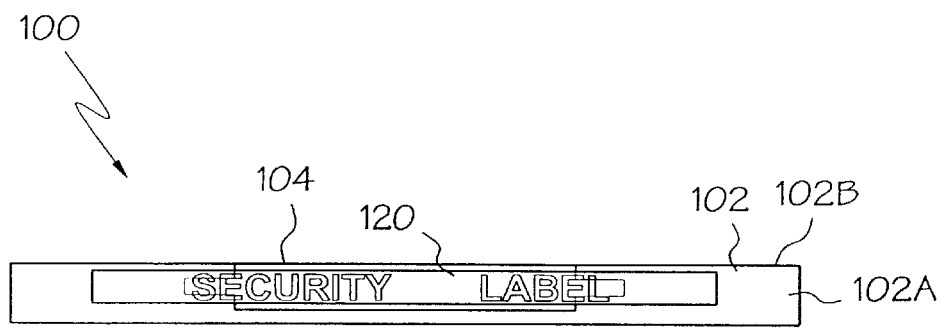
FIG. 12 is a side view of the smart card of FIG. 12 with a security label extending across the side thereof.

Additional security features may be used to prevent tampering or unauthorized access with the smart cards 10, 100. For example, referring to FIG. 11, the smart card 10 includes a security label 120 extending over a portion of the card body 12 and the semiconductor chip assembly 14. The security label 120 includes an appropriate adhesive to secure the label 120 to the card body 12 and the chip assembly 14. It should be apparent that if the smart card 10 is a contact-type card, the security label 120 should not cover any of the leads 18 which make electrical contact with the reader (not shown). For added protection, the security label 120 extends across the top face 12A and a bottom face 12B of the card body 12. A similar security label 120 may be appropriately positioned on the smart card 100. In addition, as shown in FIG. 12, the security label 120 may be positioned so that it extends across the side 102A of the card body 102.

Figure 13:
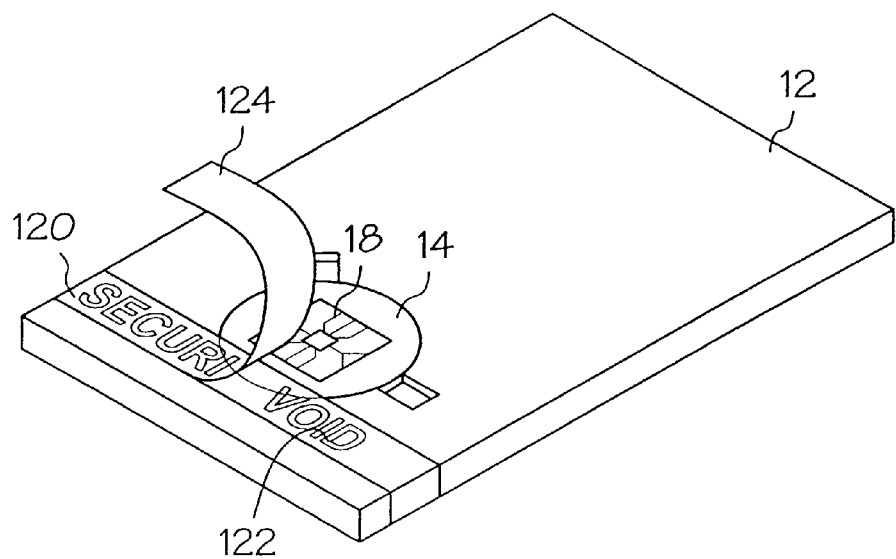
FIG. 13 is a perspective view of the smart card of FIG. 11 with the security label partially torn away.
Figure 14:
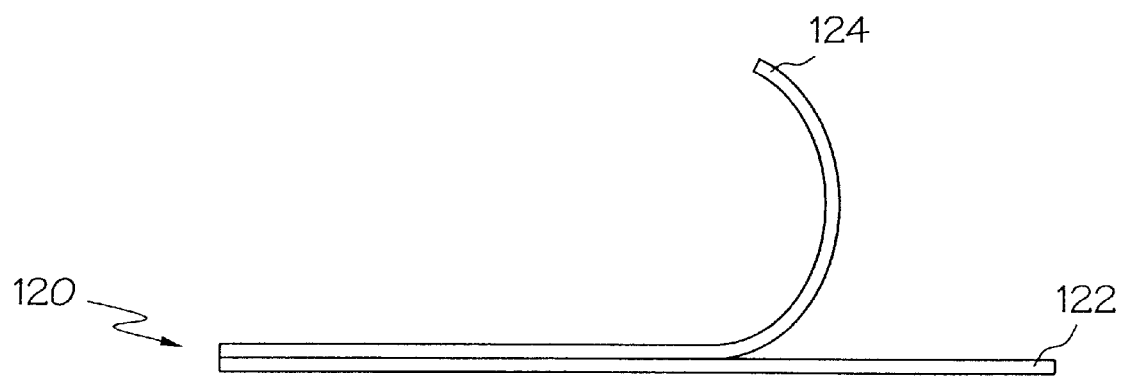
FIG. 14 is a side view of a security label.

The security label 120 is configured to provide an indication of tampering. In one aspect of the present invention, the security label 120 includes a strong adhesive causing noticeable damage to the label 120 upon attempts to remove it. In another aspect of the present invention as shown in FIGS. 13 and 14, the security label 120 includes a frangible layer 122 which separates from at least a top or main layer 124 resulting in at least a portion of the frangible layer 122 remaining on the smart card 10. The portion of the frangible layer 122 remaining on the smart card 10 may provide a visual message, such as "VOID" indicating tampering with the smart card 10. Alternatively, separation of the frangible layer 122 from the main layer 124 may prevent the main layer 124 from readhereing to the frangible layer 122. It will be appreciated by those skilled in the art that the frangible layer 122 and the main layer 124 may be reversed with the main layer 124 remaining on the smart card 10 as the frangible layer 122 separates from the main layer 124 when removed.

In another aspect of the present invention, the security label 120 may include a holographic layer which is destroyed upon removal of the label 120. Paper security labels may also be used in conjunction with or in place of the film type security labels described above. It will be appreciated by those skilled in the art that other security labels may be used to provide an indication of tampering upon inspection of the smart card 10, 100. It should be apparent that the security labels 120 will need to be replaced upon authorized removal of the semiconductor chip assembly 14, 104. The surfaces of the card body 12, 102 and the semiconductor chip assembly 14, 104 will have to be cleaned using appropriate materials. The smart cards 10, 100 may be constructed so that the semiconductor chip assembly 14, 104 has low bonding strength while the card body 12, 102 has high bonding strength to control the amount of adhesive residue that needs to be removed from the semiconductor chip assembly 14, 104.

The card bodies 12, 102 may be printed by any suitable method depending on the card surface, such as thermal transfer, ink jet, impact or toner based printing. The card bodies 12, 102 could be embossed after printing, if desired, or before printing depending on the print method. The smart cards 10, 100 may include one or more additional features, such as bar codes, magnetic strips, and MICR, as desired. Preferably, the semiconductor chip assembly 14, 104 is inserted or reinserted into the card body 12, 102 after the card body 12, 102 has been processed as described above. The security label 120 is applied after the semiconductor chip assembly 14 is secured within the card body 12, 102.

The chip assembly 14, 104 may be removed from the card body 12, 102 as necessary when the card body itself wears out or when the information printed on the card is obsolete. The present invention enables the chip assemblies to be removed by authorized personnel possessing the appropriate removal tool and provides a visual indication when the chip assembly as been tampered with by unauthorized personnel. The expensive chip assemblies may be reused as necessary thereby reducing costs and preventing unnecessary waste.

Having described the invention in detail and by reference to preferred embodiments thereof, it will be apparent that modifications and variations are possible without departing from the scope of the invention defined in the appended claims.

What is claimed is:

1. A card comprising:
    a card body having a face, an edge, and a cut-out portion extending at least partially through said face, said cut-out portion intersecting at least a portion of said edge defining an opening in said edge; and
    a semiconductor chip assembly having a semiconductor device positioned thereon, said semiconductor chip assembly being insertable within said cut-out portion through said opening such that at least a portion of said semiconductor chip assembly defines a portion of the card body periphery, wherein said card body includes a first locking member within said cut-out portion and wherein said semiconductor chip assembly includes a corresponding second locking member such that said semiconductor chip assembly is locked within said cut-out portion of said card body as said first locking member engages said second locking member.

2. The card of claim 1, wherein:
    said semiconductor chip assembly further comprises first and second projections extending along opposing sides thereof; and,
    said card body further comprises first and second grooves formed on opposing sides of said cut-out portion arranged such that upon inserting said semiconductor chip assembly within said cut-out portion, said first and second projections engage corresponding ones of said first and second grooves.

3. The card of claim 1, wherein:
    said card body further comprises first and second projections formed on opposing sides of said cut-out portion; and,
    said semiconductor chip assembly further comprises first and second grooves extending along opposing sides thereof and arranged such that upon inserting said semiconductor chip assembly within said cut-out portion, said first and second projections engage corresponding ones of said first and second grooves.

4. The card of claim 1, further comprising a security label, said security label being placed over a portion of said card body and a portion of said semiconductor chip assembly thereby providing an indication of tampering with said semiconductor chip assembly.

5. The card of claim 4, wherein said security label comprises a frangible layer.

6. The card of claim 4, wherein said security label comprises a holographic layer.

7. The card of claim 4, wherein said security label extends across a top face and a bottom face of said card body.

8. The card of claim 4, wherein said security label extends across said side of said card body.

9. The card of claim 1, wherein a top surface of said semiconductor chip assembly is substantially coplanar with a top face of said card body.

10. The card of claim 1, wherein said first and second locking members comprise opposing hooks which engage one another as said semiconductor chip assembly is slid into place.

11. The card of claim 1, wherein said card body further comprises a laminate formed on a back face thereof covering at least part of said cut-out portion.

12. A card comprising:
    a card body having:
        a front face;
        a back face;
        an edge;
        a cut-out portion extending at least partially through said front face intersecting at least a portion of said edge defining an opening in said edge; and
        a laminate formed on said back face covering said cut-out portion
    a semiconductor chip assembly having a semiconductor device positioned thereon, said semiconductor chip assembly being insertable within said cut-out portion through said opening such that at least a portion of said semiconductor chip assembly defines a portion of the card body periphery.

13. The card of claim 12, wherein:
    said semiconductor chip assembly further comprises first and second projections extending along opposing sides thereof; and,
    said card body further comprises first and second grooves formed on opposing sides of said cut-out portion arranged such that upon inserting said semiconductor chip assembly within said cut-out portion, said first and second projections engage corresponding ones of said first and second grooves.

14. The card of claim 12, wherein:
    said card body further comprises first and second projections formed on opposing sides of said cut-out portion; and,
    said semiconductor chip assembly further comprises first and second grooves extending along opposing sides thereof and arranged such that upon inserting said semiconductor chip assembly within said cut-out portion, said first and second projections engage corresponding ones of said first and second grooves.

15. The card of claim 12, wherein said card body includes a first locking member within said cut-out portion and wherein said semiconductor chip assembly includes a corresponding second locking member such that said semiconductor chip assembly is locked within said cut-out portion of said card body as said first locking member engages said second locking member.

16. The card of claim 15, wherein said first and second locking members comprise opposing hooks which engage one another as said semiconductor chip assembly is slid into place.

17. The card of claim 12, further comprising a security label, said security label being placed over a portion of said card body and a portion of said semiconductor chip assembly thereby providing an indication of tampering with said semiconductor chip assembly.

18. The card of claim 17, wherein said security label comprises a select one of a frangible layer and a holographic layer.

19. The card of claim 17, wherein said security label extends across a top face and a bottom face of said card body.

20. The card of claim 17, wherein said security label extends across said side of said card body.

21. The card of claim 12, wherein a top surface of said semiconductor chip assembly is substantially coplanar with a top face of said card body.

22. A method of forming a card comprising:
providing a card body;
forming a cut-out portion in a top face of said card body extending at least partially therethrough, said cut-out portion intersecting at least a portion of an edge of said card body defining an opening in said edge of said card body;
forming a first locking member within said cut-out portion;
providing a semiconductor chip assembly having a semiconductor device formed thereon;
forming a corresponding second locking member on said semiconductor chip assembly; and
sliding said semiconductor chip assembly into said cut-out portion through said opening such at least a portion of said semiconductor chip assembly defines a portion of the card body periphery and said semiconductor chip assembly is locked within said cut-out portion of said card body as said first locking member engages said second locking member.

23. The method of claim 22, wherein said step of providing a semiconductor chip assembly comprises the step of forming first and second projections extending along opposing sides of said semiconductor chip assembly, and wherein said step of forming a cut-out portion in said card body extending through a side thereof comprises the step of forming corresponding first and second grooves on opposing sides of said cut-out portion, said first and second projections of said semiconductor chip assembly arranged to engage said corresponding first and second grooves.

24. The method of claim 22, wherein said step of forming a cut-out portion in said card body extending through a side thereof comprises the step of forming first and second projections extending along opposing sides of said cut-out portion, and wherein said step of providing a semiconductor chip assembly comprises the step of forming corresponding first and second grooves on opposing sides of said semiconductor chip assembly, said first and second projections of said card body arranged to engage said corresponding first and second grooves.

25. The method of claim 22, further comprising the step of applying a security label over a portion of said card body and a portion of said semiconductor chip assembly thereby providing an indication of tampering with said semiconductor chip assembly.

26. The method of claim 25, wherein said security label extends across said top face and a bottom face of said card body.

27. The method of claim 25, wherein said security label extends across said side of said card body.

28. The method of claim 22, wherein said step of forming a cut-out portion in said card body is performed by injection molding of said card body.

29. The method of claim 22, wherein said step of forming a cut-out portion in said card body is performed by milling said card body.

30. The method of claim 22, wherein said step of forming a cut-out portion in said card body comprises the step of punching out said cut-out portion in said card body.

31. A card comprising:
a card body having:
a cut-out portion extending partially through said card body, said cut-out portion intersecting at least a portion of an edge of said card body defining an opening in said edge of said card body;
a first locking member within said cut-out portion; and,
first and second grooves formed on opposing sides of said cut-out portion; and,
a semiconductor chip assembly having:
a semiconductor device positioned thereon;
a corresponding second locking member; and,
first and second projections extending along opposing sides thereof;
wherein said semiconductor chip assembly is insertable within said cut-out portion through said opening such that said first and second projections engage corresponding ones of said first and second grooves, and said first locking member engages said second locking member.

32. A card comprising:
a card body having a cut-out portion extending entirely through said card body, said cut-out portion intersecting at least a portion of an edge of said card body defining an opening in said edge of said card body;
a laminate formed on a back face of said card body;
a semiconductor chip assembly having a semiconductor device positioned thereon, wherein said semiconductor chip assembly is insertable within said cut-out portion through said opening such that at least a portion of said semiconductor chip assembly defines a portion of the card body periphery.

33. The card of claim 32, wherein:
said semiconductor chip assembly further comprises first and second projections extending along opposing sides thereof; and,
said card body further comprises first and second grooves formed on opposing sides of said cut-out portion arranged such that upon inserting said semiconductor chip assembly within said cut-out portion, said first and second projections engage corresponding ones of said first and second grooves.

34. The card of claim 32, wherein:
said card body further comprises first and second projections formed on opposing sides of said cut-out portion; and,
said semiconductor chip assembly further comprises first and second grooves extending along opposing sides thereof and arranged such that upon inserting said semiconductor chip assembly within said cut-out portion, said first and second projections engage corresponding ones of said first and second grooves.

35. The card of claim 32, wherein said card body includes a first locking member within said cut-out portion and wherein said semiconductor chip assembly includes a corresponding second locking member such that said semiconductor chip assembly is locked within said cut-out portion of said card body as said first locking member engages said second locking member.

36. The card of claim 35, wherein said first and second locking members comprise opposing hooks which engage one another as said semiconductor chip assembly is slid into place.

37. The card of claim 32, further comprising a security label, said security label being placed over a portion of said card body and a portion of said semiconductor chip assembly thereby providing an indication of tampering with said semiconductor chip assembly.

* * * * *